(12) United States Patent
Ahluwalia

(10) Patent No.: US 11,051,142 B2
(45) Date of Patent: Jun. 29, 2021

(54) USING WIRELESS RATE MODELS BASED ON UTILIZED FREQUENCY RESOURCES

(71) Applicant: AT&T Intellectual Property I, L.P., Atlanta, GA (US)

(72) Inventor: Inderpreet Ahluwalia, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 99 days.

(21) Appl. No.: 16/434,171

(22) Filed: Jun. 6, 2019

(65) Prior Publication Data

US 2020/0389768 A1    Dec. 10, 2020

(51) Int. Cl.
| | | |
|---|---|---|
| H04M 15/00 | (2006.01) | |
| H04M 17/00 | (2006.01) | |
| H04W 4/24 | (2018.01) | |
| H04W 72/04 | (2009.01) | |
| H04W 4/60 | (2018.01) | |
| H04W 8/24 | (2009.01) | |
| H04W 92/08 | (2009.01) | |

(52) U.S. Cl.
CPC .............. *H04W 4/24* (2013.01); *H04W 4/60* (2018.02); *H04W 8/24* (2013.01); *H04W 72/0453* (2013.01); *H04W 92/08* (2013.01)

(58) Field of Classification Search
None
See application file for complete search history.

(56) References Cited

U.S. PATENT DOCUMENTS

| | | | | |
|---|---|---|---|---|
| 9,332,547 | B1 * | 5/2016 | Ghavami | H04W 72/0453 |
| 2011/0194427 | A1 * | 8/2011 | Shirota | H04W 36/0022 370/252 |
| 2014/0177548 | A1 * | 6/2014 | Aihara | H04W 72/02 370/329 |
| 2016/0014681 | A1 * | 1/2016 | Yl | H04W 48/16 455/422.1 |
| 2017/0086112 | A1 * | 3/2017 | Xue | H04B 17/382 |
| 2017/0086119 | A1 * | 3/2017 | Xu | H04W 36/30 |
| 2017/0195896 | A1 * | 7/2017 | Lee | H04L 41/0893 |
| 2019/0014522 | A1 * | 1/2019 | Saga | H04W 36/20 |
| 2019/0159157 | A1 * | 5/2019 | Gupta | H04W 60/005 |
| 2019/0261252 | A1 * | 8/2019 | John Wilson | H04W 56/001 |
| 2019/0306324 | A1 * | 10/2019 | Al-Mehdar | H04W 4/24 |
| 2019/0380066 | A1 * | 12/2019 | Sharma | H04W 36/14 |
| 2020/0068449 | A1 * | 2/2020 | Jin | H04W 4/029 |
| 2020/0077431 | A1 * | 3/2020 | Tang | H04W 72/1284 |
| 2020/0128470 | A1 * | 4/2020 | Mok | H04W 40/14 |
| 2020/0280827 | A1 * | 9/2020 | Fechtel | H04W 4/80 |

\* cited by examiner

*Primary Examiner* — Ajit Patel
(74) *Attorney, Agent, or Firm* — Amin, Turocy & Watson, LLP

(57) ABSTRACT

Usage rates for user equipments (UEs) in a peer to peer wireless network are disclosed. For instance, a network device communicates via a first wireless connection with the network device, wherein the first wireless connection employs a first frequency band, and wherein the first frequency band corresponds to a first rate model. Then, a request is received to change the first frequency band to a second frequency band. A second wireless connection is established with the network device, wherein the second wireless connection employs the second frequency band, and wherein the second frequency band corresponds to a second rate model different than the first rate model.

20 Claims, 10 Drawing Sheets

500 →

LTE MODE with NR REPRESENTATION — 510

| BITS | | | | | | | | Hex Value | Interpretation | |
|---|---|---|---|---|---|---|---|---|---|---|
| b8 | b7 | b6 | b5 | b4 | b3 | b2 | b1 | | | |
| 0 | 0 | 0 | 0 | 0 | 0 | 1 | 0 | 04 | LTE only – no NR | 280 |
| 0 | 0 | 0 | 1 | 0 | 0 | 1 | 0 | 14 | LTE only & NR(sub6) | 282A |
| 0 | 0 | 1 | 0 | 0 | 0 | 1 | 0 | 24 | LTE only & NR(mmW) | 282B |
| 0 | 0 | 1 | 1 | 0 | 0 | 1 | 0 | 34 | LTE only with NR (sub6 & mmW) | 282C |

| Rate Plan | HSS provisioning SecondaryRAT | APN(s) provisioned | RATE PLAN DATA ELEMENTS | Resulting 5G Service | |
|---|---|---|---|---|---|
| Superior | Yes | 5G APN, LTE APN | LTE + NR (sub6 & mmW) | sub6, mmW | 282C |
| Premium | Yes | 5G APN, LTE APN | LTE + NR(mmW) | mmW | 282B |
| Basic 5G | Yes | 5G APN, LTE APN | LTE + NR(sub6) | sub6 | 282A |
| LTE | No | LTE APN | LTE | No 5G | 280 |

USING WIRELESS RATE MODELS BASED ON UTILIZED FREQUENCY RESOURCES

TECHNICAL FIELD

The subject application is related to wireless communication systems, and, for example, usage rates for user equipments (UEs) in a peer to peer wireless network.

BACKGROUND

Currently, modern implementations of wireless networks can use a variety of different frequency bands. Many frequency bands used have special characteristics that can make them less applicable to different problems. Because rate plans do not allow for flexibility on the different frequency bands utilized, many rate plans do not match the needs of subscribers, e.g., frequency bands are not available when needed, or unneeded frequency bands mandated.

BRIEF DESCRIPTION OF THE DRAWINGS

The technology described herein is illustrated by way of example and not limited in the accompanying figures in which like reference numerals indicate similar elements and in which:

FIGS. 4A-4B and 5 illustrate examples of data elements that can be stored in a SIM card in a UE, in accordance with one or more embodiments.

FIG. 6 illustrates an example summary table that describes the wireless rate models of FIG. 2 in additional detail, in accordance with one or more embodiments.

DETAILED DESCRIPTION

Generally speaking, one or more embodiments described herein can provide mechanisms that facilitate the development and use of wireless rate models that include network usage rates based on factors including the various combinations of resources used by a UE in connecting to the core network. One example resource that is frequently used example embodiments described herein is the frequency bands used by the UE for connection. It should be noted that this resource is non-limiting, and other types of resource can be used within the spirit of embodiments described herein. As described further below, one or more embodiments can improve: the implementation of 5G networks, user experience, network performance, network-implementation costs, network resource allocation, and other aspects of modern wireless communication.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Figure 1:
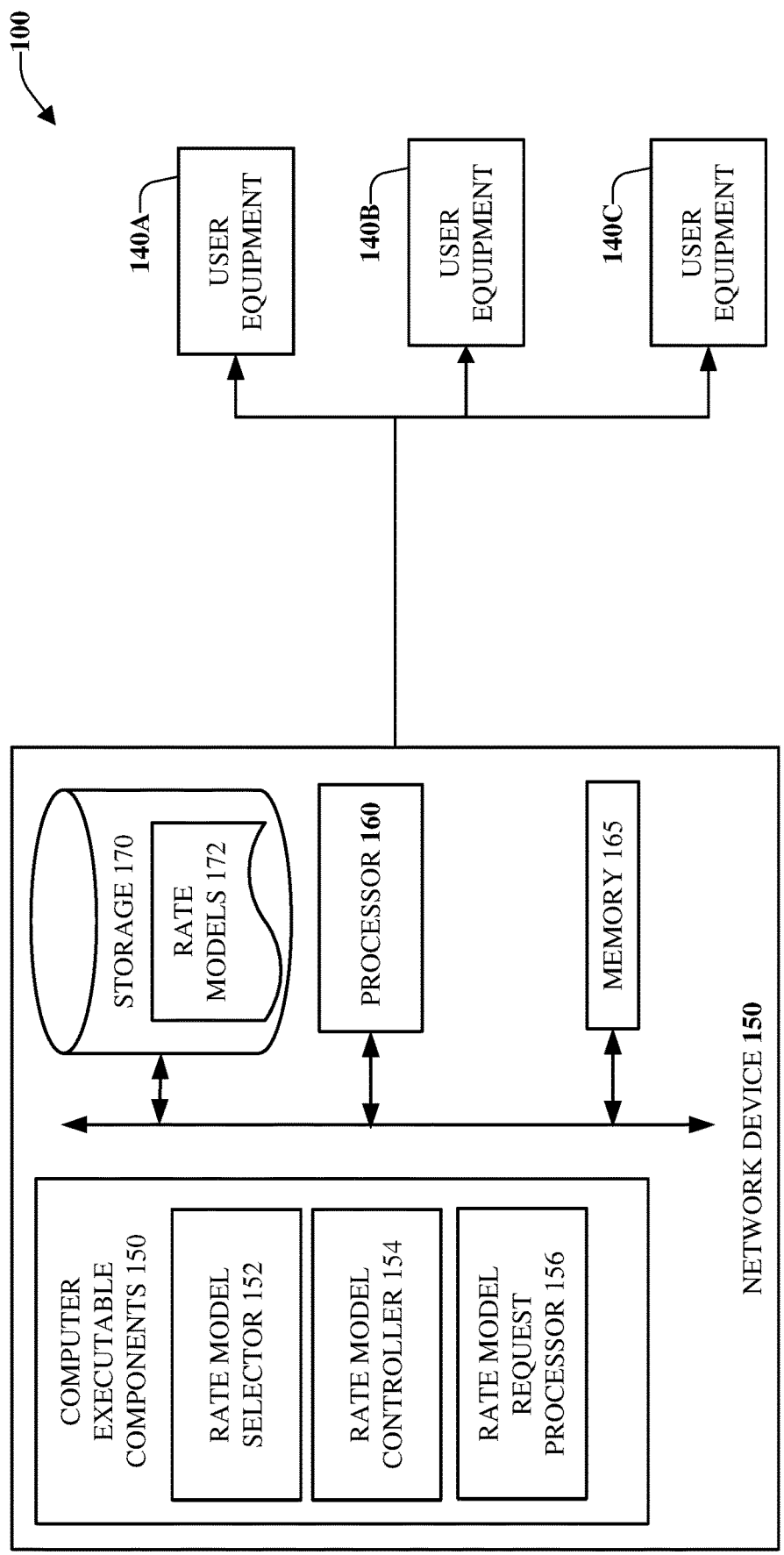
FIG. 1 illustrates a block diagram of an example, non-limiting system 100 that can facilitate the development and use of wireless rate plans based on the usage of network resources, in accordance with one or more embodiments.

FIG. 1 illustrates a block diagram of an example, non-limiting system 100 that can facilitate the development and use of wireless rate plans based on the usage of network resources, in accordance with one or more embodiments.

According to multiple embodiments, network device 150 can include memory 165 that can store one or more computer and/or machine readable, writable, and/or executable components and/or instructions that, when executed by processor 160, can facilitate performance of operations defined by the computer executable components and/or instruction(s). For example, memory 165 can store computer and/or machine readable, writable, and/or executable components and/or instructions that, when executed by processor 160, can facilitate execution of the various functions described herein relating to network device 150, including communicating resource information to the local manager.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Storage 170 can provide non-volatile memory for different applications. Further examples of memory 165 and storage 170 are described below with reference to system memory 1006 and hard disk drive (HDD) 1014 respectively. Such examples of memory 165 and storage 170 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processing unit 1004 of FIG. 10. Such examples of processor 160 can be employed to implement any embodiments of the subject disclosure.

It should be appreciated that the embodiments of the subject disclosure depicted in various figures disclosed herein are for illustration only, and as such, the architecture of such embodiments are not limited to the systems, devices, and/or components depicted therein. For example, in some embodiments, network device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

Wireless communication system 100 can employ various cellular systems, technologies, and modulation schemes to facilitate wireless radio communications between devices. While example embodiments include use of 5G new NR systems, one or more embodiments discussed herein can be applicable to any radio access technology (RAT) or multi-RAT system, including where user equipments operate using multiple carriers. Further, in one approach to implementing 5G technologies, the use of LTE technology is required, e.g., this approach can be termed 5G non-standalone (NSA). In another approach to implementing 5G technologies, the NR components of 5G can be implemented without use of LTE technology, this approach can be termed 5G standalone (SA).

As noted above, one or more embodiments can facilitate the use of rate models that include network usage rates based on factors including the various combinations of resources used by a UE in connecting to the core network, e.g., the frequency bands used to establish the wireless connection to network device 150 and the core network.

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. As discussed further below, some bands used in 5G communications can have significantly different characteristics, and thus be more useful for certain tasks, and less useful for others. One or more embodiments can facilitate the development of wireless rate models (e.g., wireless rate plans selected by consumers) that separate the different 5G bands for the purposes of billing, e.g., allowing consumers to select and pay for the use of that frequency bands that provide a wireless connection between a user equipment 140A and a network device 150. To better define the different characteristics of the frequency band, example bands are described below. It should be appreciated that different frequency bands could be used with one or more embodiments without departing from the spirit and scope of the disclosure herein.

One frequency band that can be used with implementations of 5G is in the mmWave (mmW) spectrum. The millimeter waves of mmW generally have higher frequencies (e.g., shorter wavelengths) relative to other communications waves used for wireless communication, whereby mmWave can send substantially more data between devices in less time than other wireless frequency bands. For example, one type of mmW used for 5G communications has a frequency of 39 GHz, while an example LTE frequency band is at 2300 MHz. Another advantage the comparatively shorter waves of mmW is that these smaller waves allow more antennas to be packed in the same physical dimension as compared to the longer waves of LTE band signals. Having more antennas in a smaller space can facilitate large-scale spatial multiplexing and highly directional beamforming, which can further increase data throughput rates, as compared to LTE signals.

Disadvantages to mmW signals can include increased path loss, penetration loss, and fading, as compared to other frequency bands that are used for wireless communications. In some circumstances, this can cause the propagation of mmW waves to be less favorable than LTE band signals, e.g., mmW nodes have a shorter range than LTE signals, with obstacles and other interreference potentially having more effect on the usefulness of these signals than other signals. Different implementations of mmW nodes and different rate models are discussed with FIG. 2 below.

Another frequency band that can be used for 5G wireless connections is termed the Sub-6 GHz bands (Sub-6). As the name suggests this frequency band has significantly lower bandwidth than the example 39 GHz mmW signals discussed above, e.g., example Sub-6 frequency bands are between 1-6 GHz. In one or more embodiments, Sub-6 with a bandwidth between LTE bands and mmW bands can offer benefits such as higher throughput than LTE signals, and longer range than mmW signals. Additional examples of combining available 5G bands to facilitate a wireless connections are discussed below.

As discussed further with FIGS. 2-7 below, one or more embodiments can apply a usage model to one or more of UEs 140A-140C that can be based, at least in part, upon the different technologies that are combined to establish a wireless connection to network device 150, e.g. LTE, 5G NSA, and 5G SA technologies. It should be noted that these technologies can include a combination of several bandwidths (e.g., LTE, Sub6, and mmW) and, in another example, one or more embodiments can select a usage model based on the bandwidths chosen.

Figure 2:
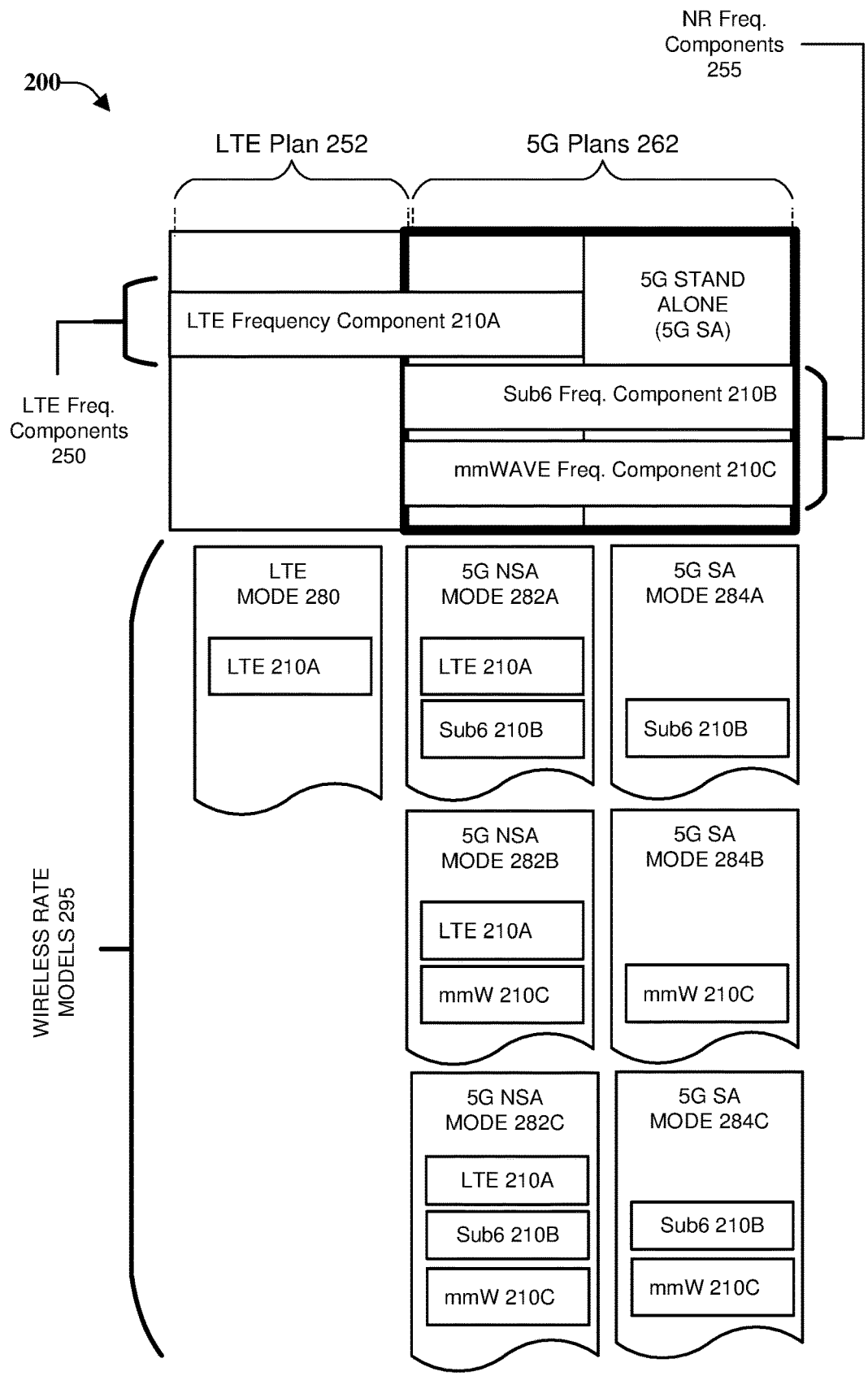
FIG. 2 illustrates example approach to applying different usage models to different combinations of resources (frequency bands) utilized by LTE plans and 5G plans, in accordance with one or more embodiments.

FIG. 2 illustrates example approach to applying different usage models to different combinations of resources (frequency bands) utilized by LTE plans 252 and 5G plans 262, in accordance with one or more embodiments. For purposes of brevity, description of like elements and/or processes employed in other embodiments is omitted.

One approach to proving wireless connectivity can label different offerings as LTE plans 252 and 5G plans 267, and an approach to charging subscribers for wireless connectivity can charge for the use of either plan, without modifications in price based on which available frequency components 250 and 255 are utilized by the subscriber, e.g., which components the subscriber wants, needs to perform different functions, and are supported by the user equipment of the subscriber, that is, when a subscriber with a user equipment that does not support mmW frequency component 210C selects one of 5G plans 262, the subscriber is paying for available services that are not being used. In this example, without incurring additional costs (e.g., mmW is not being used), a provider could discount this 5G plan, thereby potentially making it available to more subscribers.

Returning to the example of FIG. 2, it can be noted that one of 5G plans 262 includes the use of LTE frequency component 210A while the other 5G plan 262 does not. Both 5G plans 262 can utilize Sub-6 frequency component 210B and mmW frequency component 210C. While the top portion of FIG. 2 shows available frequency bands, the bottom portion depicts example wireless rate models 295 that are associated with the frequency band resources that are available. For example, when a subscriber who receives large amounts of data is operating in an area with many mmW nodes, a model 295 associated with 5G NSA mode 282B can either, by one or more embodiments, be selected for use by the subscriber or be automatically allocated for use based on an analysis of the geographic area in which they primarily operate (e.g., without many mmW nodes) and their pattern of data use (e.g., regularly receives large amounts of data).

In another element of one or more embodiments, to determine a price of different wireless rate models 295, the frequency band components that are used (e.g., 5G NSA MODEL 282A uses Sub-6 frequency component 210B and LTE frequency component 210A) can have individual prices associated with their use and availability for use. The approach can facilitate the assigning of prices for different components. As another benefit, considering that different nodes can cost more to implement and maintain (e.g., a large number of mmW components can be used to cover an area), one or more embodiment can factor in these different costs when assigning prices.

Figure 3:
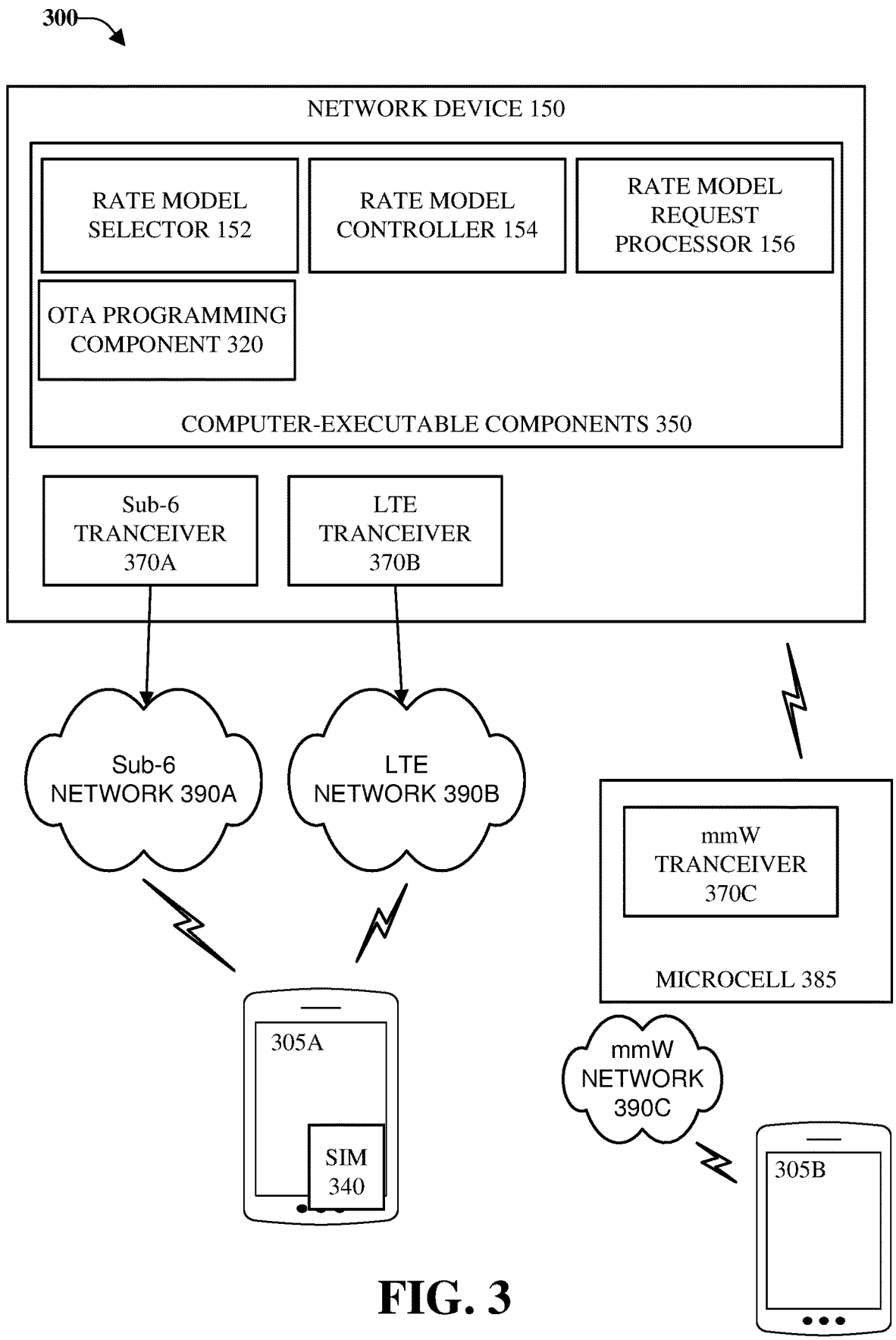
FIG. 3 illustrates a non-limiting example of a system with a network device that can provide wireless connectivity to UEs by frequency bands that can include LTE, Sub-6, and mmW frequency bands, in accordance with one or more embodiments.

FIG. 3 illustrates a non-limiting example of system 300 with network device 150 that can provide wireless connectivity to UEs 305A-B by frequency bands that can include LTE, Sub-6, and mmW frequency bands, in accordance with one or more embodiments. For purposes of brevity, description of like elements and/or processes employed in other embodiments is omitted.

In an example with elements depicted in FIG. 3, network device 150 receives (e.g., by rate model request processor 156) a request from UE 305A to use a 5G rate plan. In response one or more embodiments can employ rate model selector 152 to select from wireless rate models 295. In different embodiments, rate model selector 152 can select a model based a request from the user, or based on usage patterns associated with UE 305A. Continuing the example, based on conditions discussed above (e.g., many mmW nodes available and large amounts of data received), a model 295 associated with 5G NSA mode 282B is selected. Continuing this example, to assign the rate model to UE 305A, rate model controller can perform different functions.

One approach that can be used by one or more embodiments is to use over the air (OTA) programming to modify subscriber information module (SIM) 340 installed in UE 305A. Currently, from a provider perspective (e.g., for home subscriber server (HSS) provisioning) the availability to a subscriber of Sub-6 and mmW are not differentiated, e.g., both are available under a 5G service offering. FIGS. 4-7 provide examples of how existing SIM card implementations can be used provide additional details to facilitate one or more embodiments described herein. Based on the rate model associated with 5G NSA mode 282B, UE 305A can wirelessly connect to LTE network 390B (e.g., provided by LTE transceiver 370B) and mmW network 390C (e.g., provided by mmW transceiver 370C). In an alternative embodiment, selecting rate plans associated with either 5G NSA mode 282A or 282C can enable a wireless connection with Sub-6 network 390A.

Continuing the example depicted in FIG. 3, in one or more embodiments, example UE 305B is a UE that only has capabilities to use mmW network 390C. It should be appreciated that, without elements of the one or more embodiments described herein (e.g., elements to provide rate plans that enable not having to pay for use of Sub-6 network 390A and LTE network 390B), UEs like UE 305B with specific capabilities would not be as useful.

As depicted, microcell 385 can provide mmW network 390C. The one or more communication service provider networks discussed herein, can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

Figures 4A, 4B:
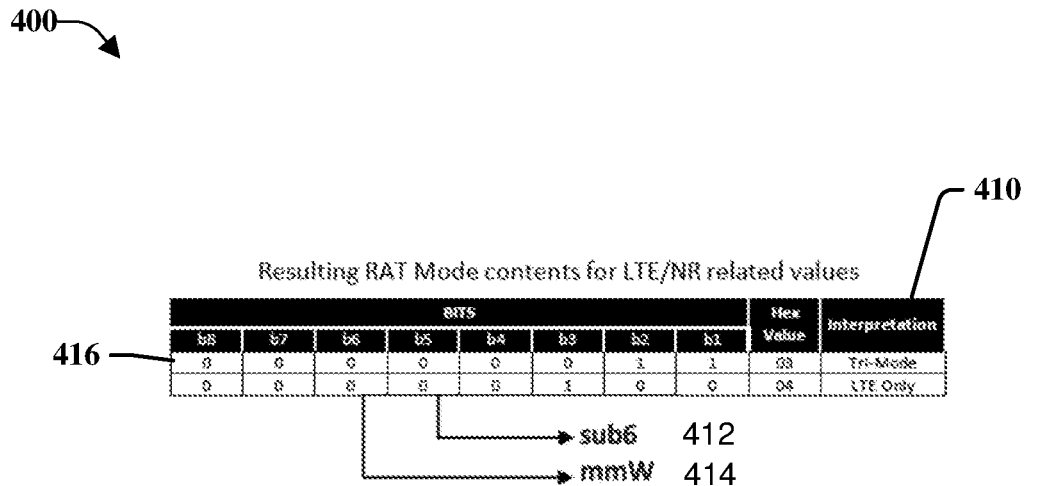

FIGS. 4A-4B and 5 illustrate examples of data elements that can be stored in SIM card 340 in UE 305A, in accordance with one or more embodiments. For purposes of brevity, description of like elements and/or processes employed in other embodiments is omitted.

FIG. 4A depicts a table 410 of a SIM data element that can support many of the elements of one or more embodiments described herein. In an example, to enable the extra information to distinguish between the uses of different frequency bands, existing, unused bits B5 and B6 of byte 416 can be used to specify whether certain NR elements are provisioned, e.g., Sub-6 412 and mmW 414. FIG. 5 depicts a table 510 showing the resulting data element, along with references to respective modes 280 and 282A-C shown in FIG. 2. FIG. 4B depicts another table 510 showing another data element resulting from the modifications table 410. A Tri-Mode band is a variation of the LTE band that also includes frequencies of 2G and 3G plans. Table 510 depicts a variation of table 420 where bit B1 is used to distinguish between Tri-Mode and LTE implementations.

FIG. 6 illustrates an example summary table 600 that describes the wireless rate models of FIG. 2 in additional detail, in accordance with one or more embodiments. For purposes of brevity, description of like elements and/or processes employed in other embodiments is omitted.

Figure 7:
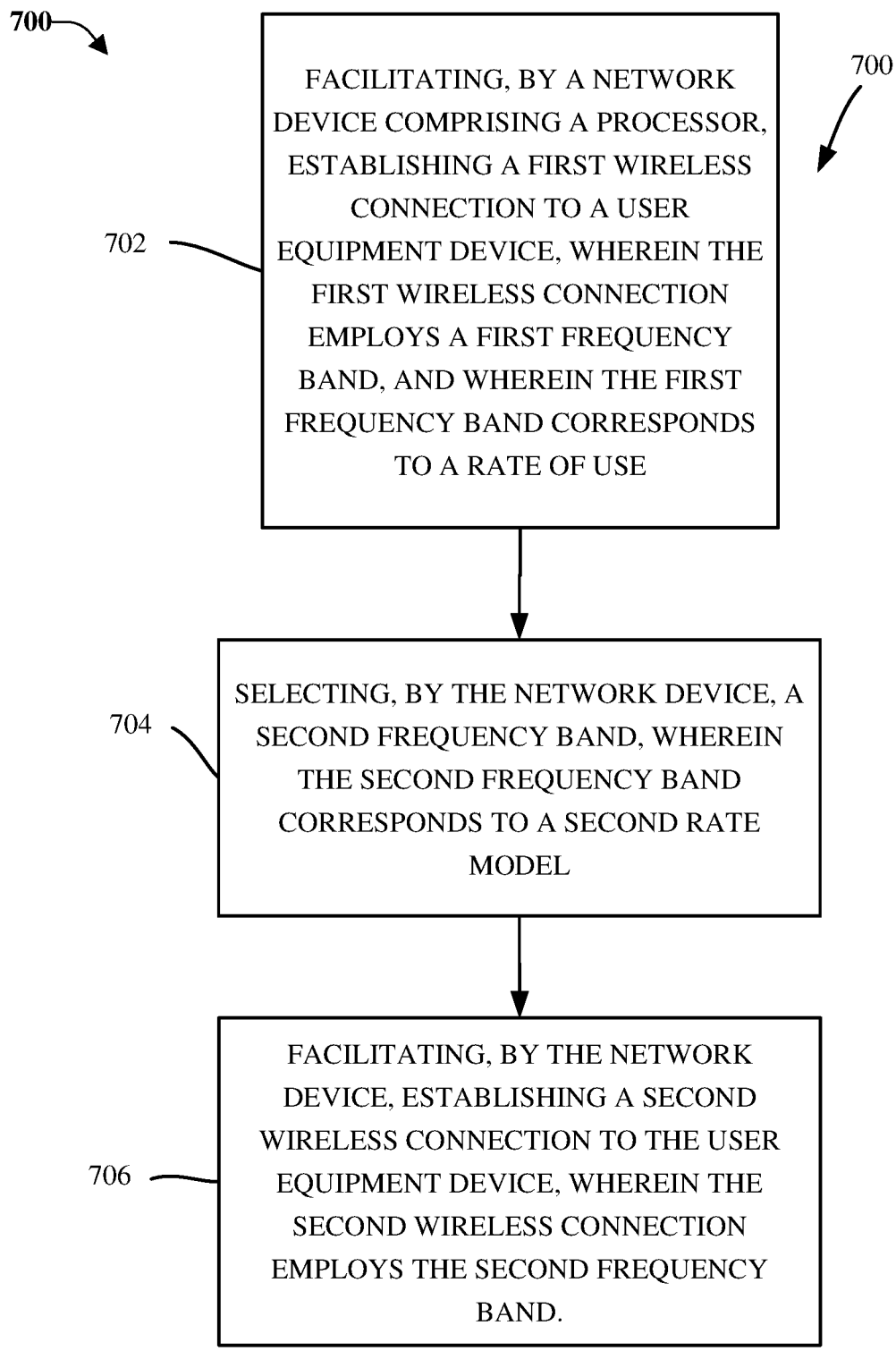
FIG. 7 illustrates a flow diagram of an example method that can facilitate development and use of wireless rate models based on use of network resources, in accordance with one or more embodiments.

FIG. 7 illustrates a flow diagram of an example method 700 that can facilitate development and use of wireless rate models based on use of network resources, in accordance with one or more embodiments. For purposes of brevity, description of like elements and/or processes employed in other embodiments is omitted.

At 702, example method 700 can facilitating, by a network device comprising a processor, establishing a first wireless connection to a user equipment device, wherein the first wireless connection employs a first frequency band, and wherein the first frequency band corresponds to a rate of use. At 704, example method 700 can selecting, by the network device, a second frequency band, wherein the second frequency band corresponds to a second rate model. At 706, example method 700 can facilitate, by the network device, establishing a second wireless connection to the user equipment device, wherein the second wireless connection employs the second frequency band.

Figure 8:
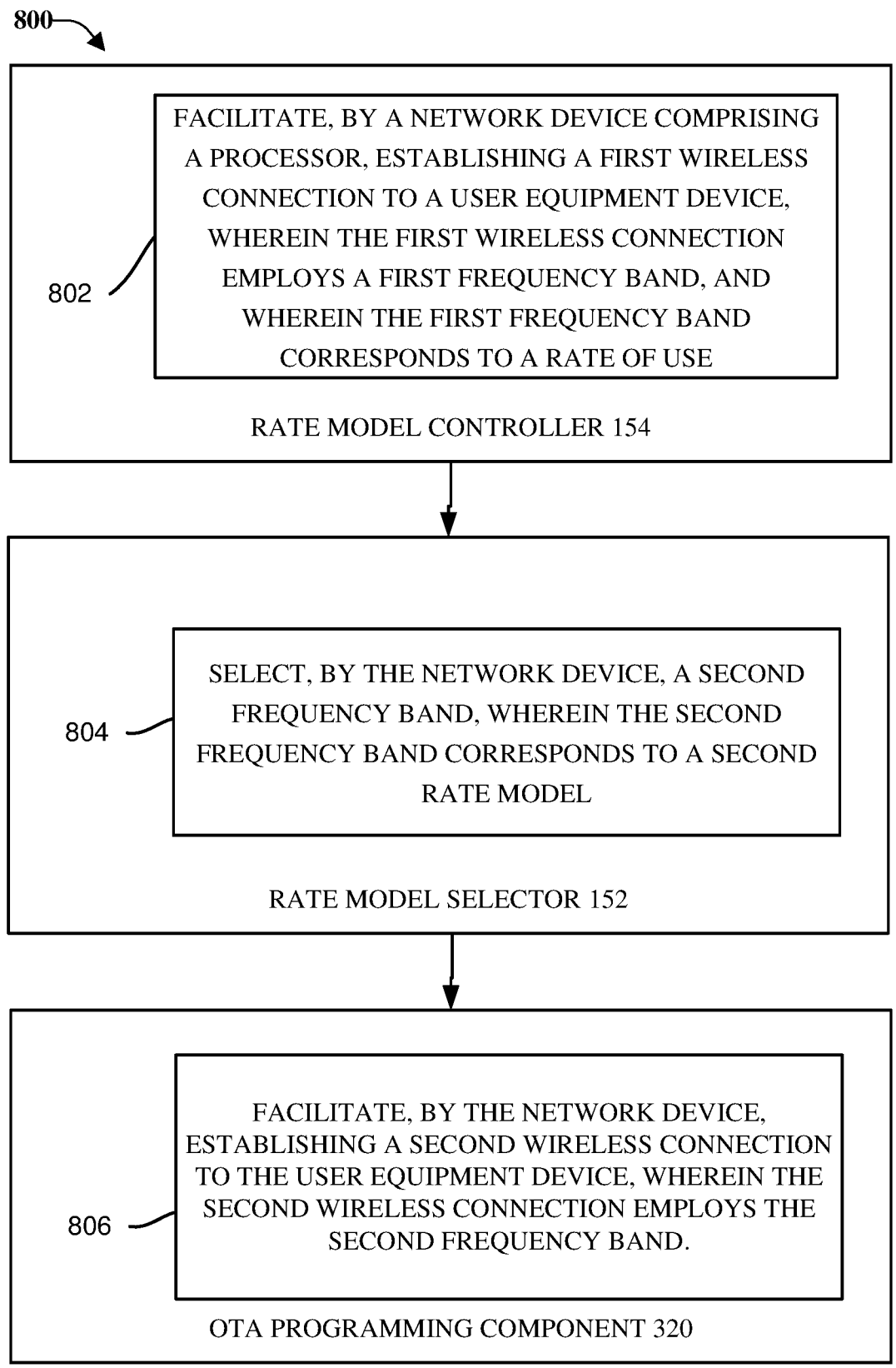
FIG. 8 is a flow diagram representing example operations of system that can facilitate development and use of wireless rate models based on use of network resources, in accordance with one or more embodiments.

FIG. 8 is a flow diagram 800 representing example operations of system that can facilitate development and use of wireless rate models based on use of network resources, in accordance with one or more embodiments.

At 802, the system can facilitate, by a network device comprising a processor, establishing a first wireless connection to a user equipment device, wherein the first wireless connection employs a first frequency band, and wherein the first frequency band corresponds to a rate of use. At 804, the system can select, by the network device, a second frequency band, wherein the second frequency band corresponds to a second rate model. At 806, the system can facilitate, by the network device, establishing a second wireless connection to the user equipment device, wherein the second wireless connection employs the second frequency band.

Figure 9:
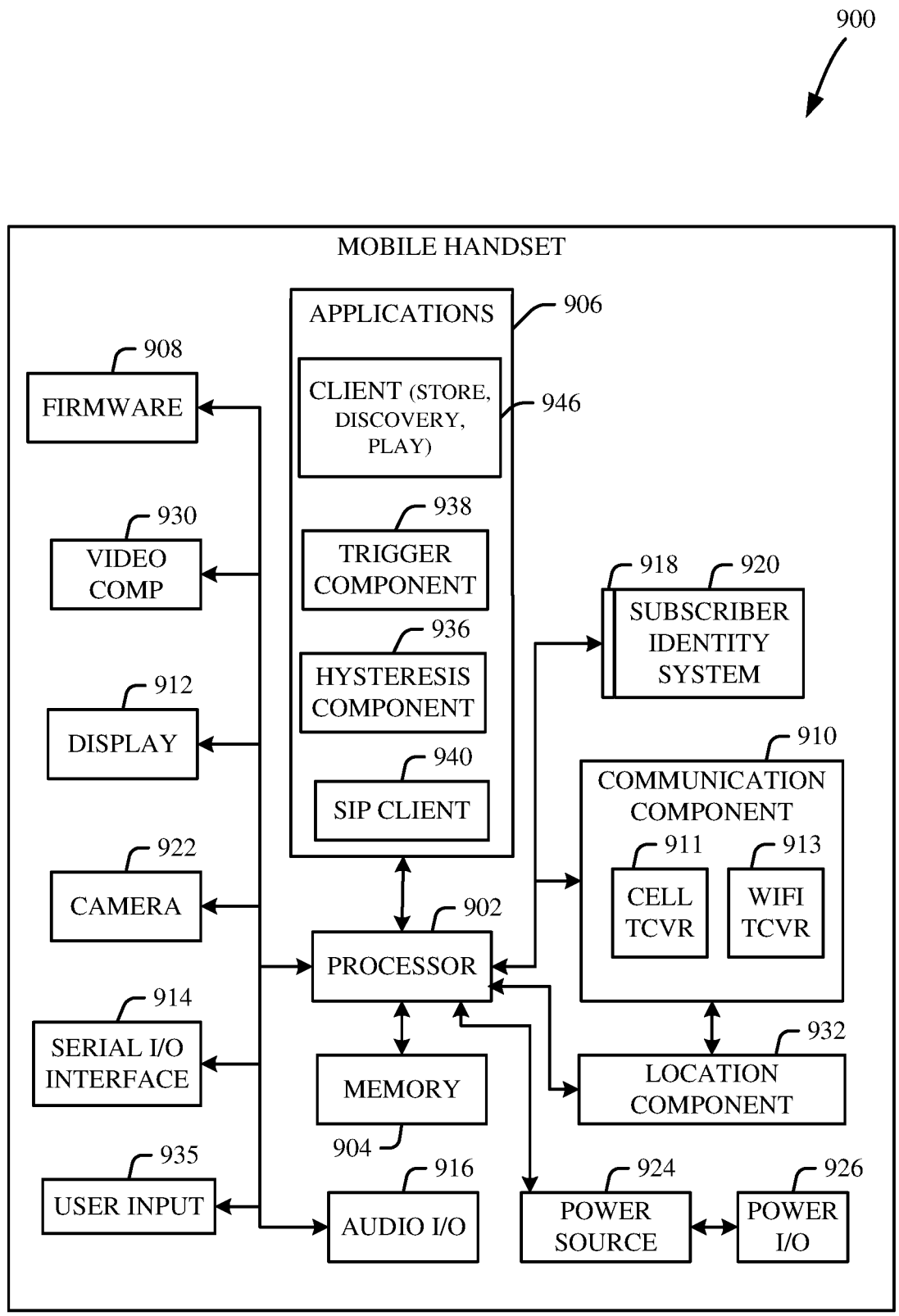
FIG. 9 illustrates an example block diagram of an example mobile handset operable to engage in a system architecture that can facilitate processes described herein, in accordance with one or more embodiments.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network devices can be connected to the one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

The wireless communication systems discussed herein can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, a wireless communication system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices can be configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Figure 10:
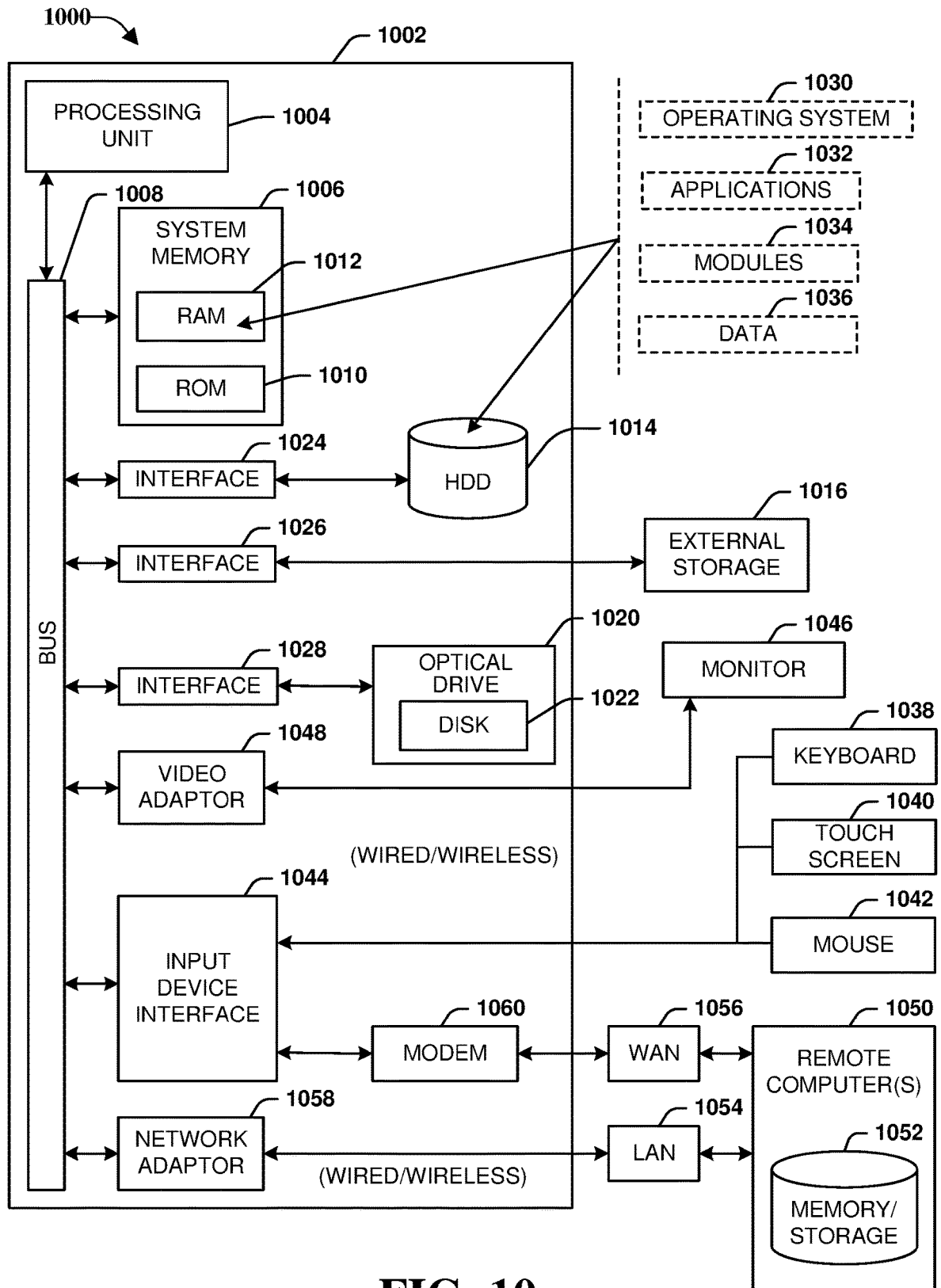
FIG. 10 illustrates an example block diagram of an example computer operable to engage in a system architecture that can facilitate processes described herein, in accordance with one or more embodiments.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE)1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, comprising:
determining that a network device supports communication via a first signal protocol and a second signal protocol in accordance with at least a fifth generation network radio access network protocol, wherein the first signal protocol and the second signal protocol are different millimeter wave signal protocols corresponding to a first rate model and a second rate model, respectively, and wherein the first rate model and the second rate model are different rate models;
communicating with the network device via a first wireless connection, wherein the first wireless connection employs a first frequency band corresponding to the first signal protocol;
based on the employing of the first frequency band, applying the first rate model to the communicating with the network device;
receiving a request to change from the first frequency band to a second frequency band corresponding to the second signal protocol;
establishing a second wireless connection with the network device, wherein the second wireless connection employs the second frequency band; and
based on the employing of the second frequency band, applying the second rate model to the communicating with the network device.

2. The system of claim 1, wherein the operations further comprise, based on the determining that the network device supports the first signal protocol and the second signal protocol, updating a subscriber information module of the network device.

3. The system of claim 1, wherein the operations further comprise facilitating sending a notice to the network device corresponding to the second signal protocol.

4. The system of claim 1, wherein the request to change the first frequency band to the second frequency band is received from the network device.

5. The system of claim 1, wherein the first signal protocol operates at a first bandwidth that is at least 24 gigahertz.

6. The system of claim 1, wherein the second signal protocol operates at a second bandwidth that is at most 6 gigahertz.

7. The system of claim 1, wherein the second frequency band is preset as supported by the system.

8. A method, comprising,
determining, by network equipment comprising a processor, that a user equipment supports communication via a first frequency band protocol and a second frequency band protocol in accordance with at least a fifth generation network radio access network protocol, wherein the first frequency band protocol and the second frequency band protocol are different millimeter wave frequency band protocols;
facilitating, by the network equipment, establishing a first wireless connection to the user equipment, wherein the first wireless connection employs the first frequency band protocol corresponding to a first rate of use;
selecting, by the network equipment, the second frequency band protocol corresponding to a second rate of use, different from the first rate of use; and
facilitating, by the network equipment, establishing a second wireless connection with the user equipment, wherein the second wireless connection employs the second frequency band protocol.

9. The method of claim 8, further comprising facilitating, by the network equipment, receiving a request from the user equipment to change from the first frequency band protocol to the second frequency band protocol, wherein the selecting the second frequency band protocol is based on the request.

10. The method of claim 9, wherein the user equipment received the request from a user interface of the user equipment to change from the first frequency band protocol to the second frequency band protocol, and wherein the selecting of the second frequency band protocol is based on the request from the user interface of the user equipment.

11. The method of claim 8, further comprising facilitating, by the network equipment, sending notice to the user equipment corresponding to the second frequency band protocol.

12. The method of claim 8, further comprising, based on the determining that the user equipment supports the first frequency band protocol and the second frequency band protocol, updating, by the network equipment, a subscriber information module of the user equipment to include a reference to the first rate of us and the second rate of use.

13. The method of claim 8, wherein the user equipment further supports a protocol of a long term evolution radio access network.

14. The method of claim 8, wherein the first wireless connection is terminated based on a confirmation of the establishing of the second wireless connection.

15. The method of claim 8, wherein the second frequency band protocol is predefined as a capability of the user equipment.

16. A non-transitory machine-readable medium, comprising executable instructions that, when executed by a processor of network equipment, facilitate performance of operations, comprising:
  establishing a first wireless connection to a user equipment, wherein the first wireless connection employs a first frequency band protocol, wherein the first frequency band protocol corresponds to a first rate plan, wherein the user equipment supports communication via the first frequency band protocol and a second frequency band protocol in accordance with a fifth generation or later network radio access network protocol, wherein the first frequency band protocol and the second frequency band protocol are different millimeter wave frequency band protocols;
  receiving a request from the user equipment to change from the first frequency band protocol to the second frequency band protocol;
  obtaining confirmation that the second frequency band protocol is permitted to be used by the user equipment; and
  establishing a second wireless connection to the user equipment via the second frequency band protocol, wherein the second frequency band protocol corresponds to a second rate plan different from the first rate plan.

17. The non-transitory machine-readable medium of claim 16, wherein the operations further comprise providing notice to the user equipment corresponding to a confirmation that the second frequency band protocol is permitted to be used by the user equipment.

18. The non-transitory machine-readable medium of claim 16, wherein the first frequency band protocol is employed by a first radio access network and the second frequency band protocol is employed by a second radio access network.

19. The system of claim 1, wherein the operations further comprise, based on a confirmation of the establishing of the second wireless connection, terminating the first wireless connection.

20. The non-transitory machine-readable medium of claim 16, wherein the operations further comprise, based on a confirmation of the establishing of the second wireless connection, terminating the first wireless connection.

\* \* \* \* \*